United States Patent [19]
Meier et al.

[11] 3,747,309
[45] July 24, 1973

[54] DEVICE FOR SEPARATING LIQUID FROM A GAS-LIQUID OR VAPOR-LIQUID MIXTURE

[75] Inventors: Franz Meier, Oberhausen-Sterkrade; Erich Ossendorf, Bochum; Hubert Wolfgarten, Oberhausen, Sterkrade, all of Germany

[73] Assignee: Gutehoffnungshuette Sterkrade A. G., Oberhausen-Sterkrade, Germany

[22] Filed: Apr. 15, 1971

[21] Appl. No.: 134,228

[52] U.S. Cl. .................. 55/440, 55/457, 55/466
[51] Int. Cl. ............................................ B01d 45/12
[58] Field of Search .............. 55/440, 444, 447–457; 122/34, 488–491

[56] References Cited
UNITED STATES PATENTS

| | | | |
|---|---|---|---|
| 2,287,592 | 6/1942 | Andrews | 122/491 |
| 2,594,490 | 4/1952 | Patterson | 55/457 |
| 2,648,397 | 8/1953 | Ravese et al. | 55/448 |
| 3,603,062 | 9/1971 | Robbins et al. | 55/457 |

FOREIGN PATENTS OR APPLICATIONS
1,210,379  9/1959  France ................................. 55/444

*Primary Examiner*—Bernard Nozick
*Attorney*—Toren and McGeady

[57] ABSTRACT

A device for separating the liquid fraction from a gas-liquid or vapor-liquid mixture, is formed of a riser tube containing means for rotating the upwardly flowing mixture. Enclosing the upper end of the riser tube and extending upwardly and downwardly from its upper end is a collecting shell with angularly shaped deflecting surfaces positioned in the shell which extend from a point below the upper edge of the riser tube to a point spaced upwardly from the upper edge of the riser tube. An inverted U-shaped baffle is arranged at the upper end of the riser tube to direct the liquid fraction into the collecting shell and concentrically arranged deflector tubes are positioned above the riser tube for directing the separated gas or vapor fraction through the deflecting surfaces.

8 Claims, 2 Drawing Figures

PATENTED JUL 24 1973 3,747,309

INVENTORS
FRANZ MEIER
ERICH OSSENDORF
HUBERT WOLFGARTEN
BY
Toren & McGeady
ATTORNEYS

DEVICE FOR SEPARATING LIQUID FROM A GAS-LIQUID OR VAPOR-LIQUID MIXTURE

SUMMARY OF THE INVENTION

The present invention directed to a device for separating the liquid fraction from a gas-liquid or vapor-liquid mixture and, more particularly, it is directed to the arrangement of angularly shaped deflection surfaces positioned in the path of the separated vapor or liquid fraction for removing any of the liquid fraction which is retained after the initial separating action takes place.

In known separating equipment a riser tube is provided with a collecting shell disposed concentrically about its upper edge and with means located within the riser tube for rotating the mixture passing through it so that the liquid fraction is directed outwardly in a parabolic course against the inside surface of the riser tube and then passes over its upper edge into the collecting shell. The separated gas or vapor passes axially upwardly from the riser tube with a substantial portion of the liquid fraction separated from it.

Further, it has been known to use separating equipment in which the liquid fraction is separated from the gas or vapor fraction by passing the mixture against angularly shaped deflecting surfaces facing in the direction of flow of the mixture. To incorporate these deflecting surfaces with the separating means mentioned above for increasing the efficiency of the separating action, it would be necessary to arrange the deflecting surfaces to receive the entire flow of the gas or vapor fraction so that any residual liquid in the gas or vapor fraction could be removed.

Accordingly, the primary object of the present invention is to improve the efficiency of gas-liquid or vapor-liquid separators by utilizing angularly shaped deflecting surfaces facing in the flow direction of the separated gas or vapor fraction. Additionally, another object is to provide separating equipment having a high load capacity. A further object is to provide separating equipment which is particularly suited for separating the liquid fraction from the vapor fraction in a steam-water mixture which contains a multiple of its weight in water after it has left the evaporation zone of a steam generator.

Therefore, in accordance with the present invention, the upper end of a riser tube is laterally enclosed by a collecting shell within which angularly shaped deflecting surfaces, extending in the axial direction of the riser tube, are positioned. The collection shell extends above and below the upper end of the riser tube and the deflecting surfaces extend from a point below the upper edge of the riser tube to a point above its upper edge. Means are arranged within the riser tube for rotating the gas-liquid or vapor-liquid mixture rising through it so that the liquid fraction is directed against its wall and is diverted into the collection shell by means of an inverted U-shaped baffle positioned about the upper end of the tube. At its lower end, the collecting shell may be equipped with a siphon arrangement to prevent any vapor from escaping at that point.

In this separating device, the deflecting surfaces are positioned in the collecting shell to receive the separated gas or vapor fraction from the upper end of the riser tube and provide further separation of entrained liquid from the gas or vapor fraction. As indicated above, the deflecting surfaces extend from a point below the upper edge of the ascending tube to a point above the upper edge and they are closed at the top and bottom for directing the flow outwardly over the angularly shaped surfaces. With the ends of the deflecting surfaces closed the gas or vapor fraction cannot bypass about the deflecting surfaces, but is directed in a uniformly flowing manner through the surfaces. In addition, the separated liquid skimmed off by the baffle, is directed by the lower ends of the deflecting surfaces into the collecting shell so that the liquid fraction must overcome the same flow resistance as the gas or vapor fraction. The combination of the separating action within the riser tube and the deflecting surfaces improve the separating efficiency of the device and also make it possible to afford high load capacities.

The various features of novelty which characterize the invention are pointed out with particularity in the claims annexed to and forming a part of this disclosure. For a better understanding of the invention, its operating advantages and specific objects attained by its use, reference should be had to the accompanying drawing and descriptive matter in which there is illustrated and described a preferred embodiment of the invention.

DETAILED DESCRIPTION OF THE INVENTION

Figure 1:
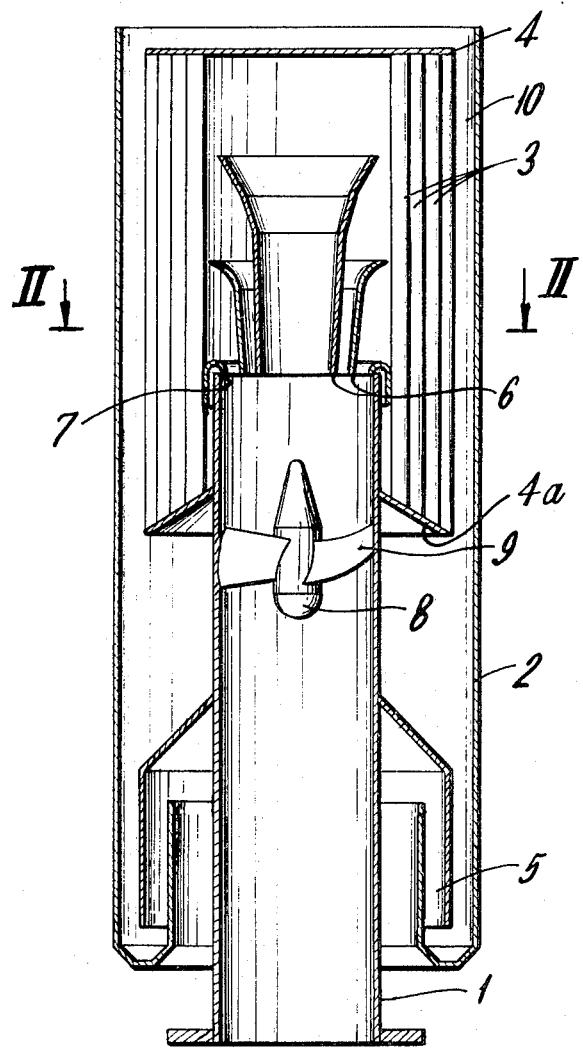
FIG. 1 is a vertical sectional view of a separating device in accordance with the present invention.

In the drawing a vapor-liquid separator is shown arranged to receive a vapor-liquid mixture containing a high percentage of liquid from the evaporation zone in a steam generator. The mixture is conducted upwardly through a riser tube 1 and a collecting shell 2 is disposed concentrically about the riser tube and is spaced outwardly from it. The collection shell extends upwardly and downwardly from the upper edge of the riser tube. Positioned within the upper part of the colleciton shell are a multiplicity of deflecting surfaces 3 arranged in the path of the mixture flowing from the upper end of the riser tube. The deflecting surfaces 3 extend in the axial direction of the riser tube.

Figure 2:
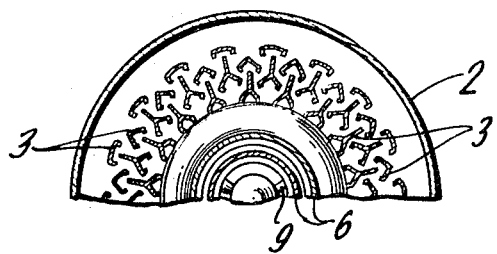
FIG. 2 is a sectional view taken along the line II—II in FIG. 1.

As shown in FIG. 2, the deflecting surfaces 3 are formed of variously shaped angularly disposed wall sections arranged in an offset or staggered portion and forming an annular ring about the upper end of the riser tube. The angularly shaped wall sections are positioned so that the angle between the wall sections which is less than 180° faces inwardly toward the axis of the riser tube. In other words, at least certain of the walls of the deflecting surfaces are directed inwardly toward the riser tube. A closure member 4 extends across the upper ends of the deflecting surfaces and also provides a closure for the space above the upper end of the riser tube. Another cover member 4a extends in an annular form about the lower ends of the deflecting tube, accordingly any flow entering the inner periphery of the deflecting surfaces is required to pass laterally through the deflecting surfaces to the outer periphery and cannot pass either upwardly or downwardly from the ends of the deflecting surfaces.

At the lower end of the collection shell a siphon 5 is provided by a upright U-shaped section located at the lower end of the collection shell and a downwardly arranged annular wall secured to the riser pipe and positioned between the inner and outer legs of the U-shaped section with its lower end located above the portion of the U-shaped section which connects its inner and outer legs. The height of the siphon 5 is dimensioned so that it is always filled with water during the separating operation.

Two flow diffusers 6 are aligned above the upper end of the riser tube providing an inner diffuser concentrically disposed about the axis of the riser tube and an outer diffuser concentrically disposed about the inner diffuser. The walls forming the diffusers diverge outwardly in the upward direction from the upper end of the riser tube. Due to the diametrical dimensions of the diffusers at their lower ends a centrally arranged area is defined by the lower end of the inner diffuser and two annular areas are defined, one between the lower ends of the inner and outer diffuser and the other between the outer diffuser and the upper end of the riser tube 1. Accordingly, the central area and the two annular areas are approximately of the same size or area. Further, the height of the diffusers 6 within the collecting shell is selected so that the distance between the edge of the outer flow diffuser and the riser tube, the distance between the upper edge of the inner diffuser and the cover 4 across the top of the deflecting surfaces, and the distance between the upper edges of the inner and outer diffusers are approximately the same.

At the upper end of the riser tube, an inverted U-shaped baffle 7 is arranged with its inner leg spaced inwardly from the riser tube and its outer leg which is longer spaced outwardly from the riser tube and extending downwardly within the collection space below the upper end of the riser tube. The spacing between the inner leg of the baffle tube and the inside wall of the riser tube corresponds approximately to the width of the rotating layer of the separated liquid fraction rising through the tube 1.

To rotate the rising gas-liquid or vapor-liquid mixture a displacement body 8 is located extending along the axis of the riser tube 1 at a position spaced downwardly from its upper end. Blades 9 bent in the manner of an impeller, are secured at their radially inner ends to the displacement body 8 and extend outwardly and are secured to the inside wall of the riser tube.

The separation of the mixture passing upwardly through the riser tube is accomplished by the displacement body 8 and its attached blades 9 with the mixture passing between the displacement body and the inside surface of the riser tube and being imparted a rotary motion by the blades 9. Due to the rotary effect developed in the mixture by the displacement body 8 and blades 9, the liquid fraction is thrown outwardly against the wall of the riser tube in a parabolic form and as it flows upwardly along the wall of the riser tube it is diverted by the baffle 7 into the collecting shell 2. The separated gas or vapor fraction passes upwardly about or through the flow diffusers which in combination with the cover plate 4 direct the gas or vapor fraction into the collecting shell 2 for passage through the angularly shaped deflecting surfaces 3. The flow diffusers 6 are dimensioned and arranged so that the separated gas or vapor flow is divided into three approximately equal parts. Any liquid entrained within the separated vapor or gas fraction is separated out on the deflecting surfaces 3 and drains downwardly into the lower part of the collection shell 2. The separated liquid fraction is removed from the lower end of the collecting shell 2. The siphon 5 provided at the lower end of the collecting shell which is filled with the liquid during the operation of the separator prevents any separated gas or vapor fraction from escaping from the lower end of the collecting shell 2. The separated gas or vapor fraction from which any liquid has been finally separated in its passage over the deflecting surfaces, is discharged from the separator through an annular gap 10 between the outer row of deflecting surfaces 3 and the collecting shell 2. From the separator the gas or vapor fraction can be introduced to a turbine, to another point of use or to a storage space.

While a specific embodiment of the invention has been shown and described in detail to illustrate the application of the inventive principles, it will be understood that the invention may be embodied otherwise without departing from such principles.

We claim:

1. A device for separating the liquid fraction from a gas-liquid mixture or a vapor-liquid mixture such as a steam water mixture, comprising a riser tube for conducting the mixture to be separated in an upward direction, a collecting shell laterally enclosing and spaced outwardly from said riser tube, the upper end of said collecting shell is positioned above the upper end of said riser tube and the lower end of said collecting shell is positioned below the upper end of said riser tube, means positioned within said riser tube and spaced downwardly from its upper end for imparting a rotary motion to the mixture conveyed upwardly through said riser tube, wherein the improvement comprises means located within said collecting chamber for forming a flow passage for the mixture flowing from the upper end of said riser tube, said means for forming a flow passage comprises a multiplicity of deflecting baffle surfaces extending in the axial direction of said riser tube in surrounding relationship therewith defining a tortuous path and positioned within said collecting shell, the upper ends of said deflecting surfaces are located above the upper end of said riser tube and below the upper end of said collecting tube and the lower ends of said deflecting surfaces are located below the upper end of said riser tube and above the lower end of said collecting tube, a first closure member extending transversely across the upper ends of said deflecting surfaces and forming a closure for the upper end of said deflecting surfaces and for the space above said riser tube, a second closure member extending around said riser tube and extending transversely of and positioned against the lower ends of said deflecting surfaces and forming a closure for the lower ends of said deflecting surfaces, an inverted U-shaped baffle positioned about the upper end of said riser tube with the bight portion of said U-shaped baffle spaced upwardly from the edge at the upper end of said riser tube and having a radially inner leg and a radially outer leg, said inner leg is located inwardly from the upper end of said riser tube and said outer leg is located outwardly from the upper end of said riser and is disposed within the flow passage in said collecting shell so that all of the flow of the mixture from said riser tube is directed over said deflecting surfaces and passes outwardly therethrough and cannot by-pass the top and bottom of said deflecting surfaces.

2. A device, as set forth in claim 1, characterized in that a siphon is arranged at the lower end of said collecting shell and comprising an upright U-shaped section forming the lower end of said collecting shell with the inner leg of said U-shaped section spaced outwardly from said riser tube, and an upright wall secured at its upper end to said riser tube and extending downwardly into said U-shaped section is located between and spaced from the inner and outer legs of said U-shaped section with the lower end of said upright wall being spaced upwardly above the portion of said U-shaped section interconnecting its inner and outer legs.

3. A device, as set forth in claim 1, characterized in that said deflecting surfaces comprise longitudinally elongated walls having an angularly shaped cross-section in a plane generally normal to the axis of said riser tube.

4. A device, as set forth in claim 3, characterized in that said longitudinally elongated walls of said deflecting surfaces form angles in a range less than 180° which angles face inwardly toward the axis of said riser tube.

5. A device, as set forth in claim 1 characterized in that a first flow diffuser tube having a diameter smaller than said riser tube is located concentrically about the axis of said riser tube and is positioned above said riser tube with its upper end located below said first closure member across the upper ends of said deflecting surfaces, and a second flow diffuser tube having a diameter greater than said first diffuser tube and less than said riser tube is positioned above said riser tube and located concentrically about and spaced outwardly from said first flow diffuser tube with its upper end located below the upper end of said first flow diffuser tube.

6. A device, as set forth in claim 5, characterized in that the walls of said first and second flow diffuser tubes diverge as said flow diffuser tubes extend upwardly from the upper end of said riser tube.

7. A device, as set forth in claim 5, characterized in that said first and second flow diffuser tubes are dimensioned transversely to the axis of said riser tube so that a central area is formed by the lower end of said first diffuser tube, a first annular area is formed between the lower ends of said first and second diffuser tubes and a third annular area is formed between the lower end of said second diffuser tube and the upper end of said riser tube with said central area first annular area and second annular area having substantially the same cross-sectional areas.

8. A device, as set forth in claim 5, characterized in that said first and second flow diffuser tubes are dimensioned in the direction of the axis of said riser tube so that the spacing between the upper end of said riser tube and the upper end of said second diffuser tube, between the upper end of said second diffuser tube and the upper end of said first diffuser tube and between the upper end of said first diffuser tube and said first closure member across the upper ends of said deflecting surfaces is substantially the same.

* * * * *